US006765454B2

(12) United States Patent
Tsukahara (10) Patent No.: US 6,765,454 B2
(45) Date of Patent: Jul. 20, 2004

(54) SEMICONDUCTOR DEVICE (75) Inventor: Yoshihiro Tsukahara, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/270,503

(22) Filed: Oct. 16, 2002

(65) Prior Publication Data

US 2003/0198091 A1 Oct. 23, 2003

(30) Foreign Application Priority Data

Apr. 23, 2002 (JP) ....................................... 2002-121123

(51) Int. Cl.⁷ ................................................ H01P 1/10
(52) U.S. Cl. ........................ 333/104; 333/103; 333/247
(58) Field of Search ........................ 333/20, 103, 104, 333/245, 247; 324/754

(56) References Cited

U.S. PATENT DOCUMENTS 4,855,696 A  *  8/1989  Tan et al. ..................... 333/20
5,231,349 A  *  7/1993  Majidi-Ahy et al. ........ 324/754
5,256,996 A  *  10/1993  Marsland et al. ............ 333/20

* cited by examiner

Primary Examiner—Robert Pascal
Assistant Examiner—Dean Takaoka
(74) Attorney, Agent, or Firm—Leydig, Voit & Mayer, Ltd.

(57) ABSTRACT

A semiconductor device includes a switching element, for example, a Schottky barrier diode, which controls transmission/cutoff of a signal transmitted between two portions of a transmission line. An anode electrode of the switching element is interposed between the two portions of the transmission line and the longitudinal direction of the anode electrode is aligned with the longitudinal direction of the transmission line. A cathode electrode of the switching element is disposed on at least one of the widthwise sides of the anode electrode, and is connected to ground.

16 Claims, 12 Drawing Sheets

SEMICONDUCTOR DEVICE

BACKGROUND OF THE INVENTION

1. Field of the Invention

The present invention relates to a semiconductor device used in the Extremely High Frequency (EHF) band, and more particularly to an electrode arrangement in a switching element used in the EHF band, such as a Schottky barrier diode.

2. Related Art

There has been known a GaAs Schottky barrier diode used as a switching element of a Monolithic Microwave Integrated Circuit (MMIC) available for various systems such as communication systems or radar systems. The Schottky barrier diode has a valuable ability for providing a switching element having a high isolation characteristic by taking advantage of its smaller on-resistance than that between the drain and source of an FET.

Figure 13A:
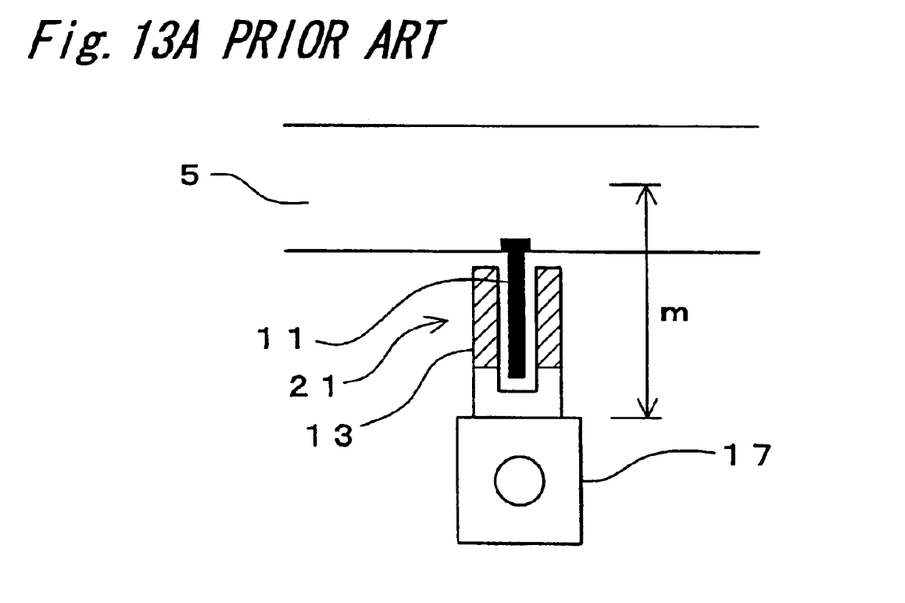
FIG. 13A is a pattern diagram of a conventional switching element.
Figure 13B:
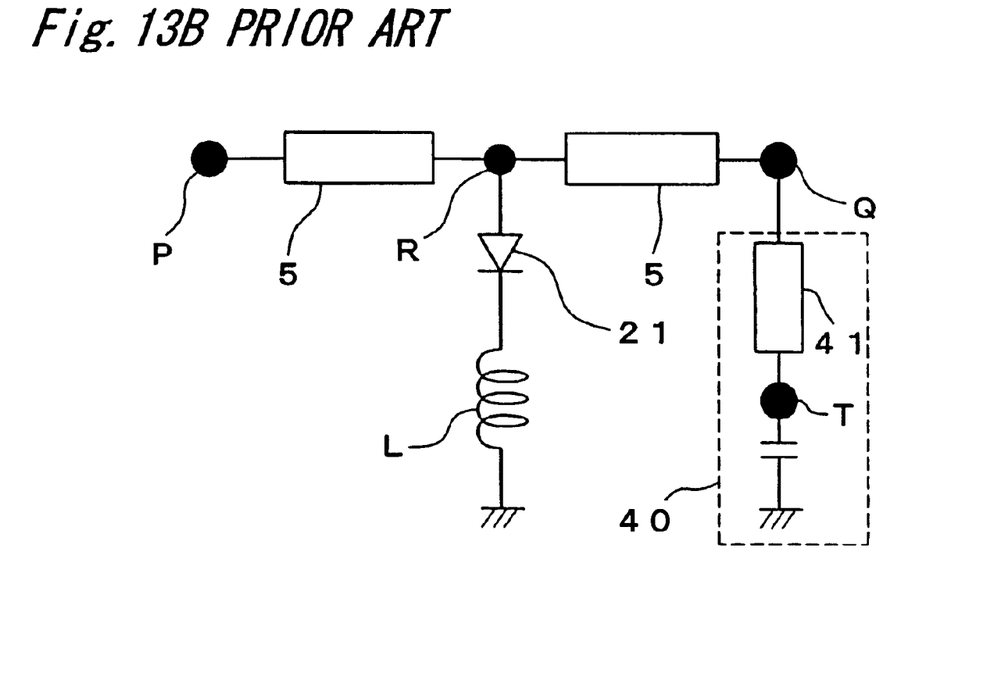
FIG. 13B is an equivalent circuit of the conventional switching element.

FIG. 13A shows an electrode arrangement in a conventional Schottky barrier diode provided on a semiconductor substrate as a switching element, and FIG. 13B shows an equivalent circuit thereof. Referring to FIG. 13A, the Schottky barrier diode 21 serving as a switching element is disposed on one of the widthwise sides of a transmission line 5. The Schottky barrier diode 21 includes an anode electrode 11 extending perpendicular to the longitudinal direction of a transmission line 5, and a cathode electrode 13. The cathode electrode 13 is grounded through a via hole 17 connected thereto.

As shown in FIG. 13B, the terminal P is an RF signal input terminal, the terminal Q is an RF signal input terminal, and a node R is a junction of the Schottky barrier diode 21 and the transmission line 5. The Schottky barrier diode 21 is connected with a parasitic inductance L, and the terminal Q is connected with a bias circuit 41 for controlling the switching operation of the Schottky barrier diode 21. The bias circuit 41 includes a line 40 having a length equal to one-fourth of the wavelength of the RF input signal. The bias circuit 41 may be connected to the terminal P or the node R.

Figure 14A:
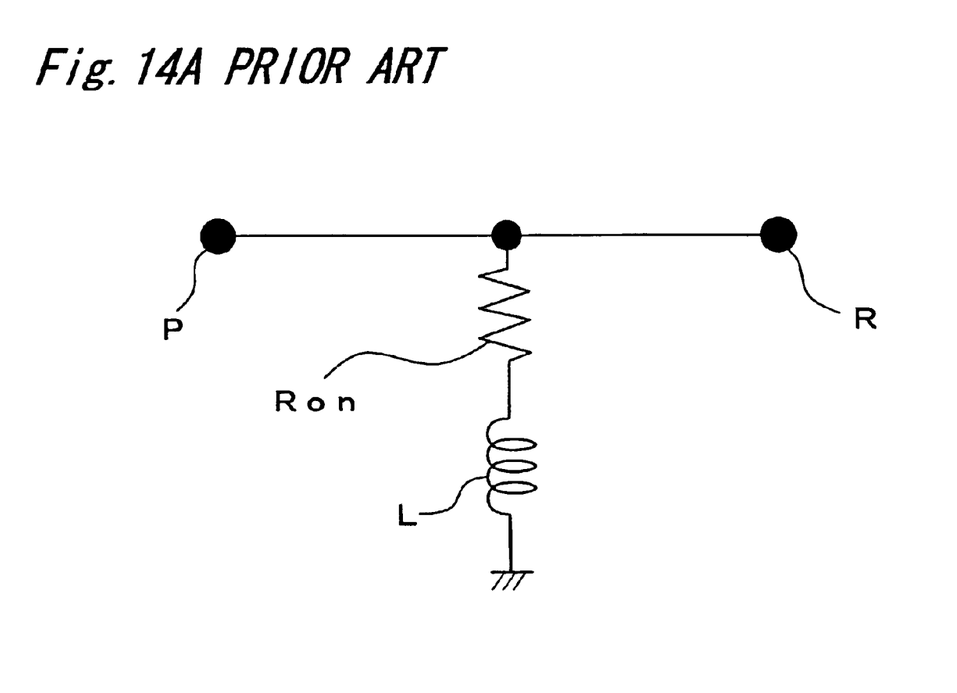
FIG. 14A is an equivalent circuit in an off-state of the conventional switching element.
Figure 14B:
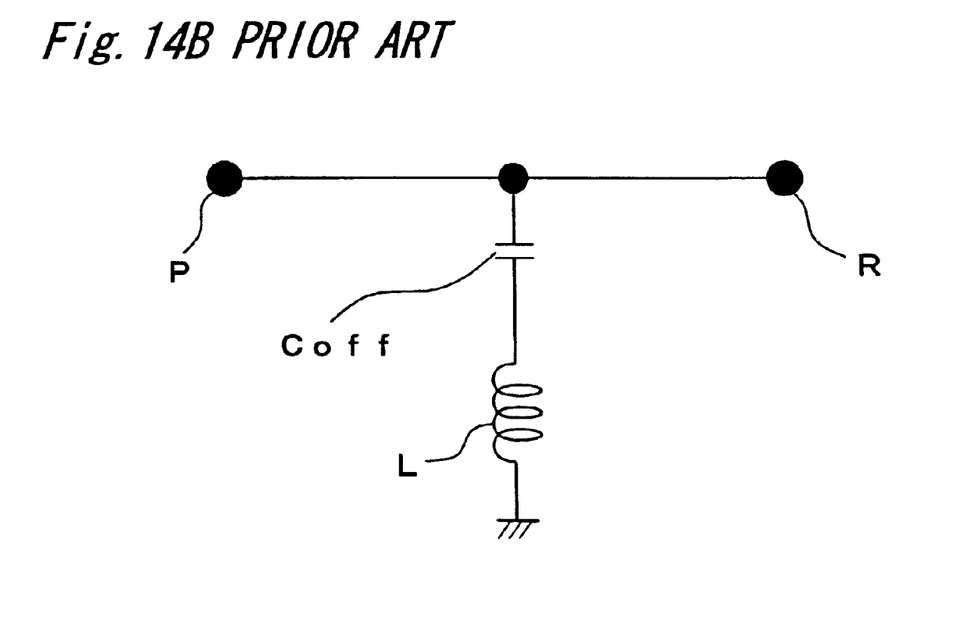
FIG. 14B is an equivalent circuit in an on-state of the conventional switching element.

In a turn-off operation of the Schottky barrier diode 21 serving as a switching element, a positive voltage Vc (Vc>Φb (Φb: a Schottky barrier voltage)) is applied to a node T of the bias circuit 41. In this time, as shown in FIG. 14A, the Schottky barrier diode 21 may be deemed as an on-resistance Ron. On one hand, a negative voltage Vc (Vc<0) is applied to the node T of the bias circuit 41 to turn off the Schottky barrier diode 21. In this time, the Schottky barrier diode 21 may be deemed as an off-capacitance Colt, as shown in FIG. 14B.

The parasitic inductance component L primarily depends on the distance m between the transmission line 5 and the via hole (ground) 17 through the Schottky barrier diode 21, and affects particularly the isolation characteristic in the off-state. Based on FIG. 14A, an isolation value $S_{21}$ in the off-state is represented as follows;

$$S_{21}=2/(2+Z_0/(R_{on}+j\omega L)) \quad (1)$$

$$\omega=2\pi f, \quad (2)$$

where $Z_0$ is a characteristic impedance, L is a parasitic inductance, and f is a frequency.

Figure 15:
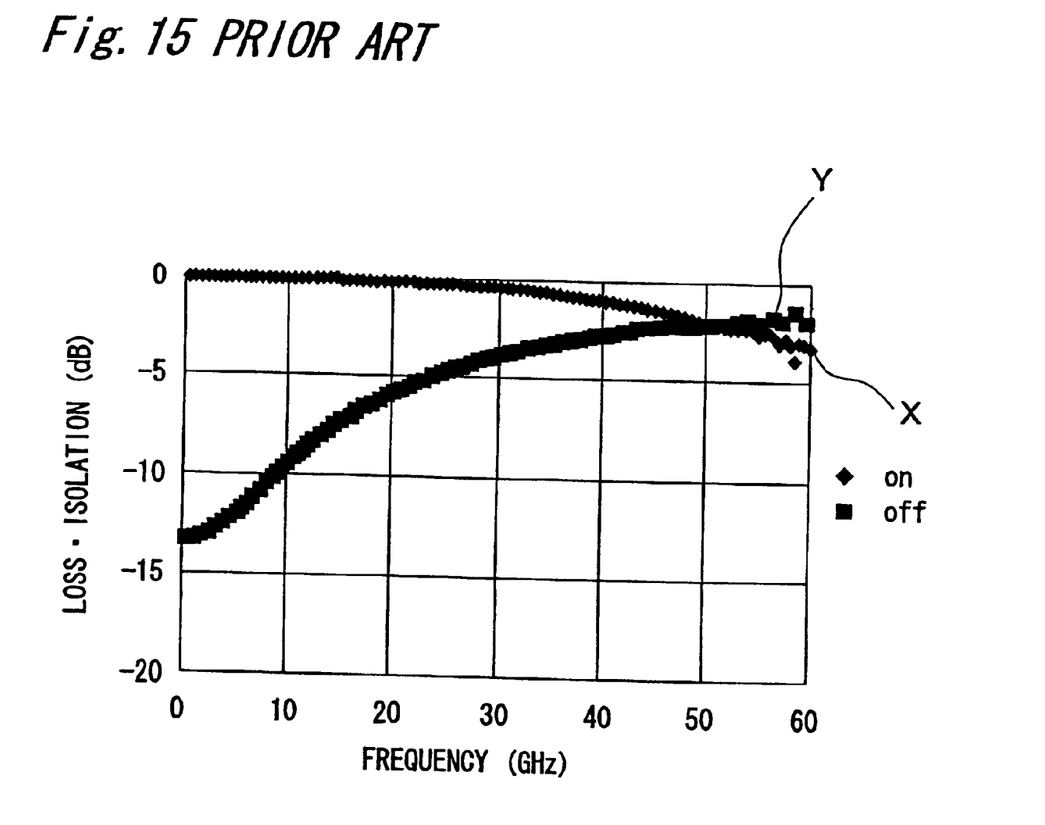
FIG. 15 shows characteristics of an insertion loss in the on-state and an isolation in the off-state for the conventional switching element.

When $R_{on}<<Z_0$, the isolation value $|S_{21}|<<1$ can be obtained in the low range of the frequency f. However, in the EHF band (f≧30 GHz), there is a problem in that the isolation value $S_{21}$ is reduced. FIG. 15 shows characteristics of an insertion loss in the on-state and an isolation value in the off-state. It is noted that in this drawing X and Y indicate the transmission loss and the isolation value, respectively.

SUMMARY OF THE INVENTION

In view of the above problem, it is therefore an object of the present invention to provide a semiconductor device including a switching element used in the EHF band which has an excellent isolation characteristic.

In order to achieve the object, in a semiconductor device of the present invention, a switching element includes an anode electrode, a cathode electrode and a via hole, wherein the anode and cathode electrodes are arranged to a transmission line so as to reduce the distance between the anode electrode and the via hole. More specifically, the anode electrode is arranged across the transmission line, within the transmission line, or in a region lying in an extending direction of the transmission line.

According to the first aspect of the present invention, provided is a semiconductor device which is mounted with a switching element operable to control transmission and cutoff of a signal transmitted between two portions of a transmission line. An anode electrode of the switching element is interposed between the two portions of the transmission line with a longitudinal direction of the anode electrode according with a longitudinal direction of the transmission line. A cathode electrode of the switching element is disposed on at least one of the widthwise sides of the anode electrode, and is connected to a ground. This arrangement allows the distance between the anode electrode and a via hole to be reduced, and thus effect of a parasitic inductance can be reduced and isolation characteristic in an off-state of the switching element can be improved.

According to the second aspect of the present invention, provided is semiconductor device which is provided with a switching element operable to control transmission and cutoff of a signal transmitted between two portions of a transmission line. An anode electrode of the switching element is interposed between the two portions of the transmission line with a longitudinal direction of the anode electrode perpendicular to a longitudinal direction of the transmission line. A cathode electrode of the switching element is disposed on at least one of the widthwise sides of the anode electrode, and is connected to a ground. This arrangement provides the same effect as that in the first aspect. In addition, the anode electrode in the second aspect is arranged to the transmission line differently by 90 degrees as compared to the anode-electrode arrangement in the first aspect. Thus, the transmission line can be arranged to extend in two different directions crossing at a right angle by using the first and second semiconductor devices in combination with each other, which provides increased flexibility of signal input/output directions.

In the above semiconductor devices, the cathode electrode may be connected to a via hole which can provide a ground connection.

In the above semiconductor devices, the transmission line may be a coplanar line including a signal line and a grounding line. In this case, the anode electrode is connected to the signal line, and the cathode electrode is connected to the grounding line. The coplanar line used as the transmission line can eliminate the need for the via hole, and thus can achieve simplified process and reduced cost in manufacturing.

In the above semiconductor devices, the switching element may have a plurality of anode electrodes. This can reduce on-resistance or enhance isolation characteristic of the Schottky barrier diode.

In the above semiconductor devices, a via hole may be formed within the cathode electrode. This can further reduce a distance between the anode electrode and the via hole and enhance isolation characteristic in the off-state.

In the first aspect, the two portions of the transmission line may be coupled each other through an air bridge over the switching element. This can enhance electrical connection between the anode electrode and the transmission line.

In the second aspect, the anode electrode may be coupled to the transmission line through an air bridge. This allows the anode electrode and the transmission line to be electrically connected with one another.

Other features and advantages of the present invention will be apparent from the accompanying drawings and from the detailed description.

DESCRIPTION OF THE PREFERRED EMBODIMENT

With reference to the drawings, a semiconductor device equipped with a switching element used in the EHF band according to the present invention will now be described in conjunction with its exemplary embodiments.

First Embodiment.

Figure 1:
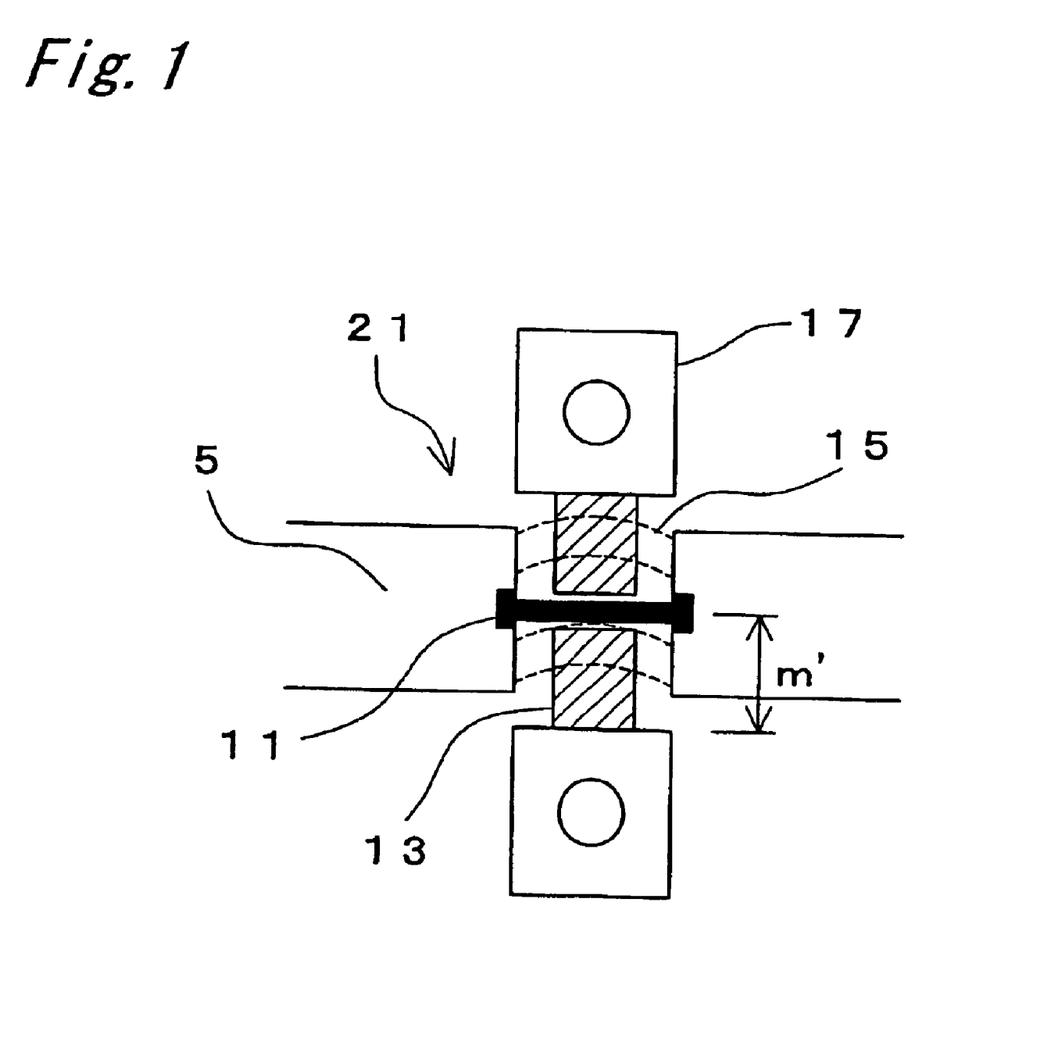
FIG. 1 is a pattern diagram of a switching element employed in a semiconductor device according to a first embodiment of the present invention.

FIG. 1 shows an electrode arrangement of a switching element of a semiconductor device according to the present invention. The switching element comprises a Schottky barrier diode. As shown in FIG. 1, the switching element or the Schottky barrier diode 21 is interposed between two portions of a transmission lines 5. An anode electrode 11 of the Schottky barrier diode 21 is inserted between the two portions of the transmission line 5 while aligning the longitudinal direction of the anode electrode 11 with the longitudinal direction of the transmission line 5, and is connected in series to the transmission line 5. A pair of cathode electrodes 13 of the Schottky barrier diode 21 are disposed, respectively, on both widthwise sides of the anode electrode 11 while sandwiching the anode electrode 11 in a direction perpendicular to the longitudinal direction of transmission line 5. The both sides of cathode electrodes 13 sandwiching the anode electrode 11 are connected to the via holes 17 which is grounded, respectively. An air bridge 15 couples the two portions of the transmission line 5 over the Schottky barrier diode to prevent deterioration of an insertion loss in an on-state of the Schottky barrier diode 21. Although in FIG. 1 the single anode electrode 11 is used, plural anode electrodes may be interposed between the two portions of the transmission line 5.

According to this embodiment, the switching element can be arranged closer to the transmission line 5 as compared to the conventional switching element shown in FIG. 13. Thus, the distance m' between the transmission line 5 and the via hole 17 becomes shorter than the distance m shown in FIG.

13. This provides suppressed parasitic inductance component depending on the distance m' and enhanced isolation characteristic.

Figure 2A:
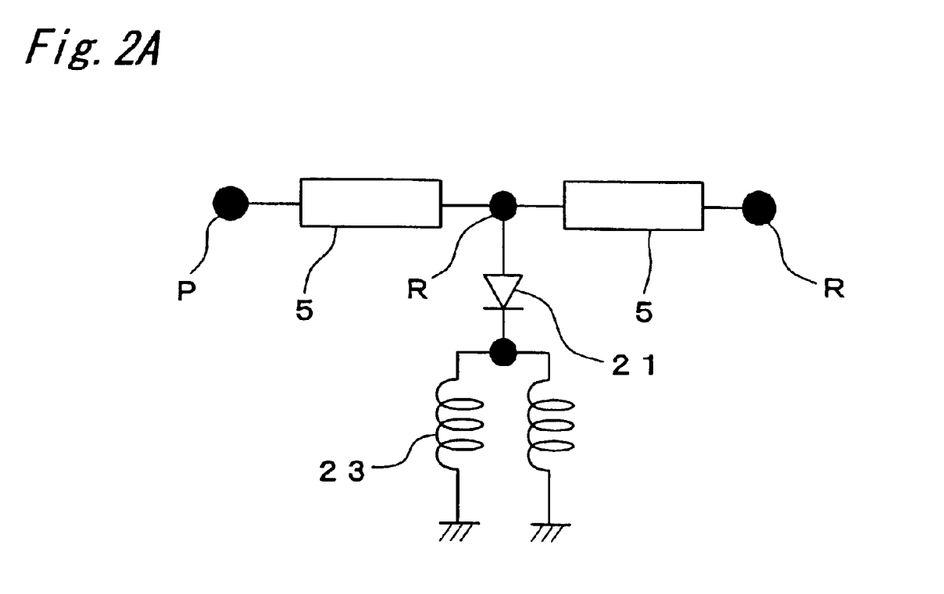
FIG. 2A is an equivalent circuit of the switching element employed in the semiconductor device according to the first embodiment of the present invention.
Figure 2B:
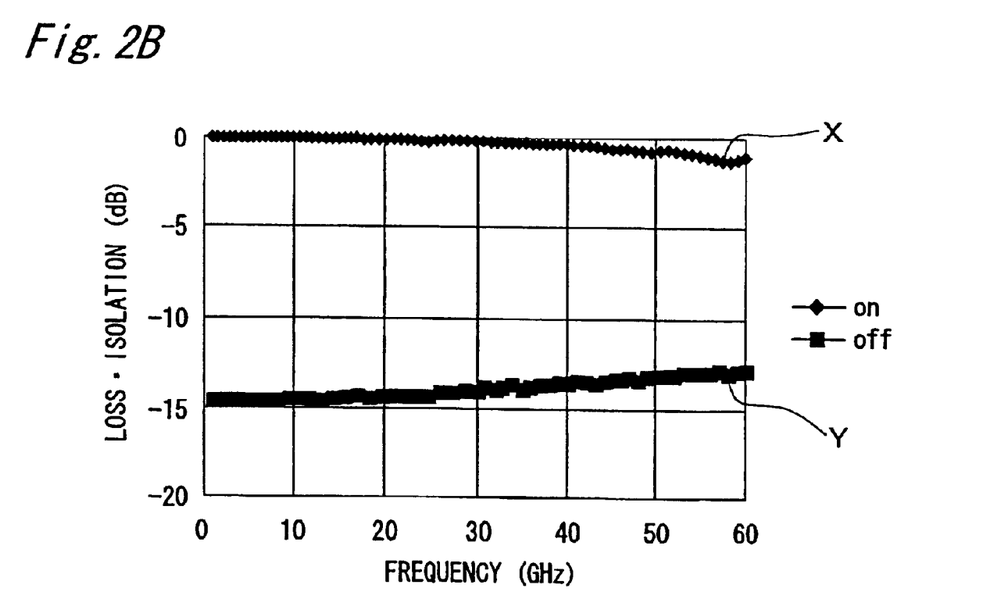
FIG. 2B shows characteristics of an insertion loss in an on-state and an isolation in an off-state for the switching element of the first embodiment.

FIG. 2A shows an equivalent circuit of the switching element having the above arrangement. In this figure, a bias circuit (refer to FIG. 13) for controlling switching operations of the switching element is omitted. Each of parasitic inductances connected to the cathodes of the Schottky barrier diode (switching element) 21 shown in FIG. 1 becomes smaller than the parasitic inductance in the conventional switching element shown in FIG. 13, because of the distance m' shorter than the distance m. Further, the parasitic inductances 23 are connected in parallel with one another through the cathode of the Schottky barrier diode (switching element) 21. Thus, the entire parasitic inductance becomes smaller than that in the conventional switching element, and thereby the isolation characteristic is improved. FIG. 2B shows characteristics of an insertion loss (X) in the on-state and an isolation (Y) in the off-state for the switching element of this embodiment. FIG. 2B proves that the isolation characteristic is improved as compared to the conventional example shown in FIG. 15.

Second Embodiment.

Figure 3:
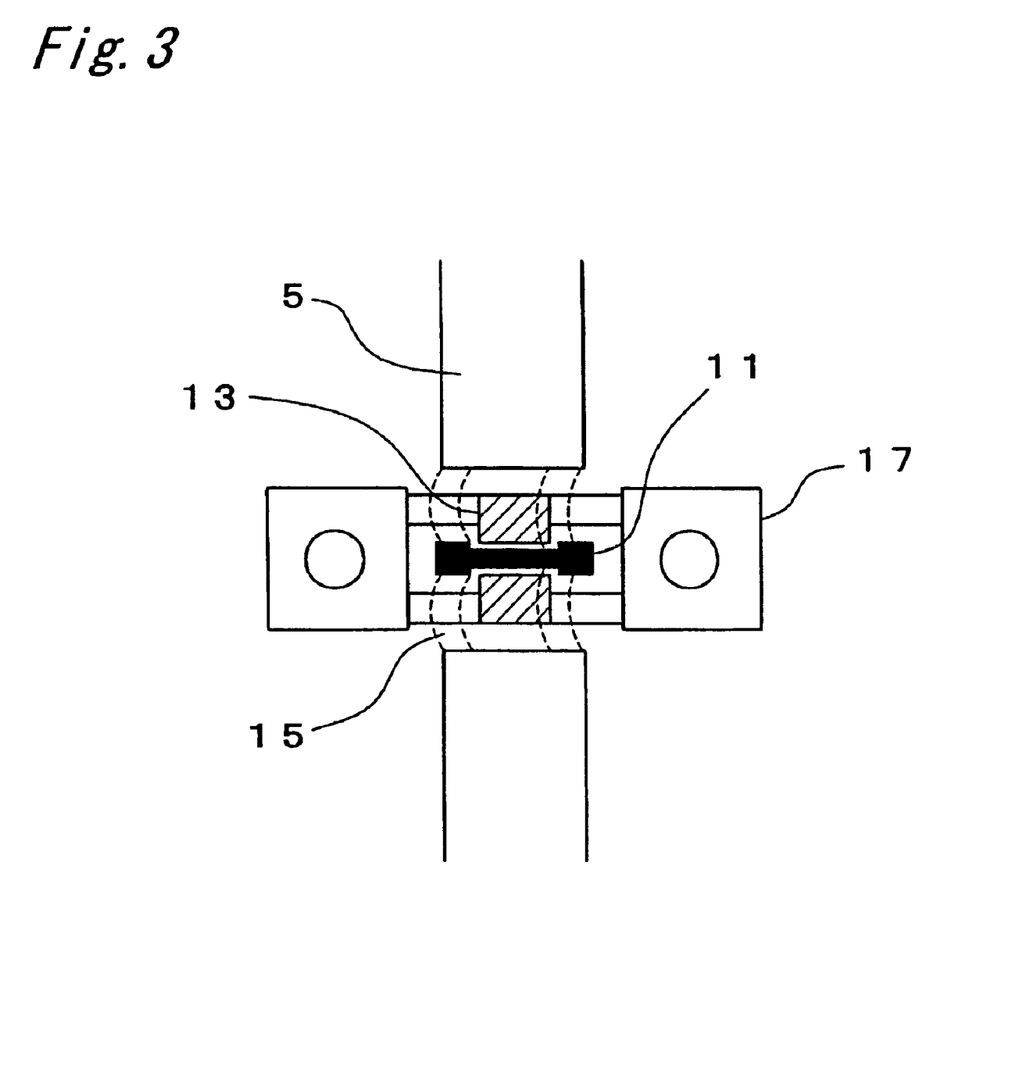
FIG. 3 is a pattern diagram of a switching element employed in a semiconductor device according to a second embodiment of the present invention, wherein an electrode arrangement of the first embodiment is rotated by 90 degrees with respect to a transmission line.

FIG. 3 shows another electrode arrangement in a switching element according to the present invention. In this embodiment, when an anode electrode 11 of a Schottky barrier diode is interposed between two portions of a transmission lines 5, the longitudinal direction of the anode electrode 11 is oriented perpendicular to the longitudinal direction of the transmission line 5. A pair of cathode electrodes 13 are disposed, respectively, on both widthwise sides of the anode electrode 11. A pair of via holes 17 are arranged to sandwich the anode electrode 11 from a direction perpendicular to the longitudinal directions of the transmission line 5, and the via holes 17 is connected to the cathodes electrode 13, respectively. This switching element arrangement provides the same effects as that from the first embodiment.

In forming a plurality of Schottky barrier diodes on the same substrate, it needs to arrange each longitudinal direction of the anode electrodes of the Schottky barrier diodes in parallel with each other, due to the requirement of the manufacturing process of the Schottky barrier diodes. Considering this requirement, by combining the switching elements of the first and second embodiments, the transmission line can be arranged to extend in two different directions crossing at a right angle on the same substrate. Input/output terminals can be located on any direction.

Figure 4A:
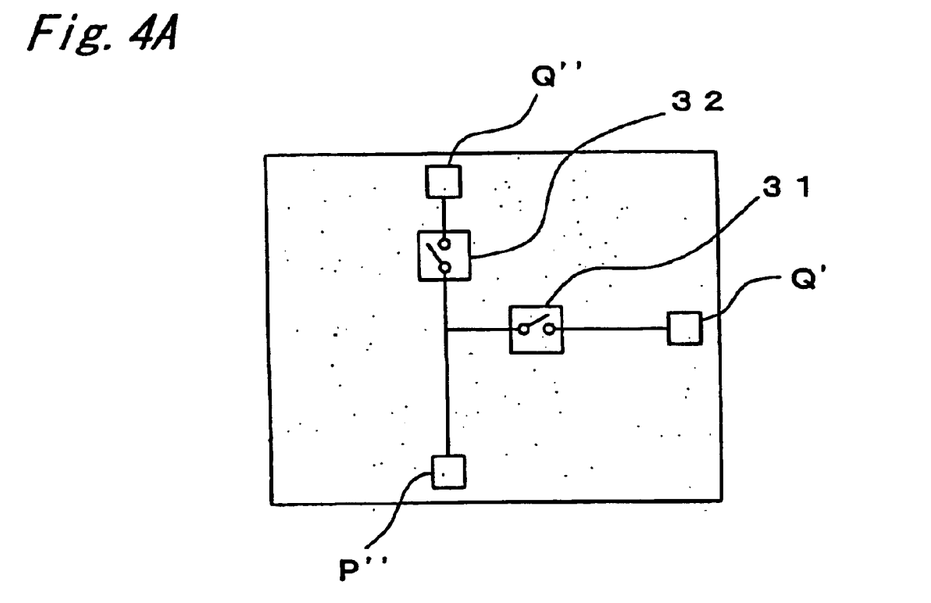
FIG. 4A is an explanatory view of the potentiality of providing an MMIC of SPDT (Single Pole Double Throw) switch by combination of the switching elements according to the first and second embodiments.
Figure 4B:
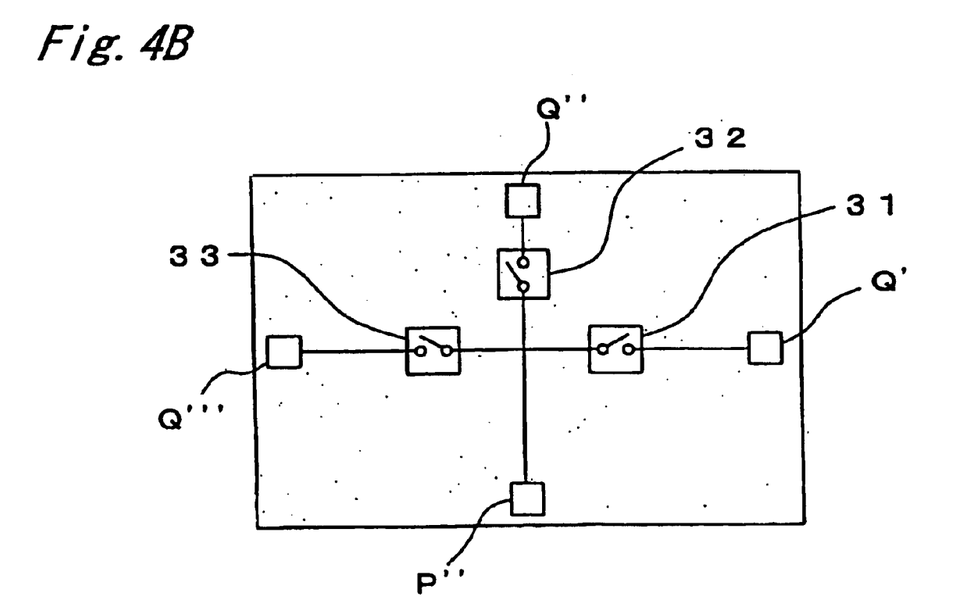
FIG. 4B is an explanatory view of the potentiality of providing an MMIC of SP3T (Single Pole Triple Throw) switch by combination of the switching elements according to the first and second embodiments.

For example, an MMIC can be achieved in a Single Pole Double Throw (SPDT) switch by arranging switches 31, 32 with orienting differently to one another by 90 degrees on a GaAs substrate as shown in FIG. 4A to provide two output ports Q' and Q" in two different directions. Further, an MMIC can be achieved in a Single Pole 3 Throw (SP3T) switch by arranging switches 31, 32 and 33 as shown in FIG. 4B to provide three output ports Q', Q" and Q"' in different directions.

Third Embodiment.

Figure 5:
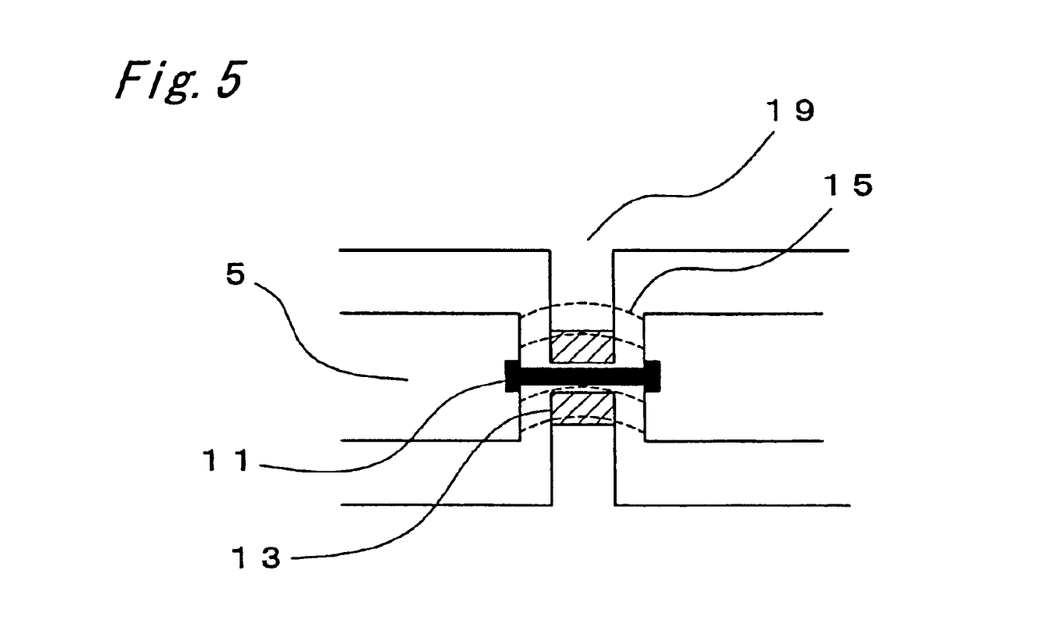
FIG. 5 is a pattern diagram of a switching element employed in a semiconductor device according to a third embodiment of the present invention, wherein a coplanar strip line is used as a transmission line.

FIG. 5 show an electrode arrangement in a switching element according to the present invention, wherein a transmission line is a coplanar line. In this embodiment, a transmission line 5 acts to transmit signals, and a line 19 is connected to the ground. An anode electrode 11 is interposed between the transmission lines 5 while aligning the longitudinal direction of the anode electrode 11 with the longitudinal direction of the transmission line 5, and connected in series to the transmission line 5. The two portions of the transmission line 5 are also coupled to each other by an air bridge 15. A pair of cathode electrodes 13 are disposed on both widthwise sides of the anode electrode 11 while sandwiching the anode electrode 11 in a direction perpendicular to the longitudinal direction of transmission line 5. The anode electrode 11 couples the two portions of the transmission lines 5 each other. According to this embodiment, the coplanar line used as the transmission line eliminates the need for the via hole, and thus achieves simplified process and reduced cost in manufacturing. A plurality of anode electrodes may be used to couple the two portions of the transmission lines 5.

Fourth Embodiment.

Figure 6:
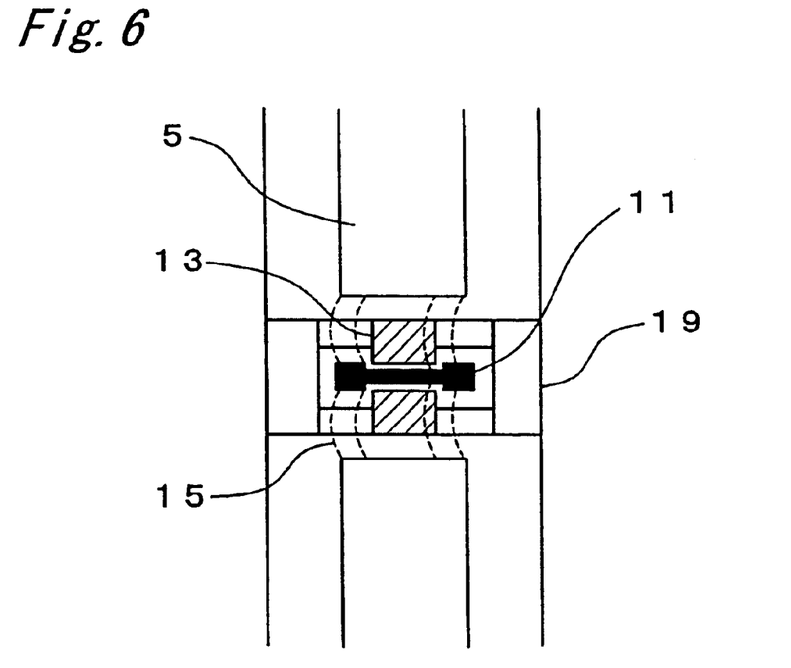
FIG. 6 is a pattern diagram of a switching element employed in a semiconductor device according to a fourth embodiment of the present invention, wherein a coplanar strip line is used as a transmission line.

FIG. 6 shows another electrode arrangement in a switching element according to the present invention, wherein a transmission line is a coplanar line. In this embodiment, an anode electrode 11 is interposed between transmission lines 5 while orienting the longitudinal direction of the anode electrode 11 perpendicular to the longitudinal direction of the transmission line 5. The transmission line 5 is coupled to the anode electrode 11 via an air bridge 15. A pair of cathode electrodes 13 are arranged to sandwich the anode electrode 11 in the longitudinal directions of the transmission line 5. By combining and using the switching elements of the third and fourth embodiments, it is possible to arrange the transmission lines each extending in two different directions crossing at a right angle on the same substrate.

Fifth Embodiment.

Figure 7A:
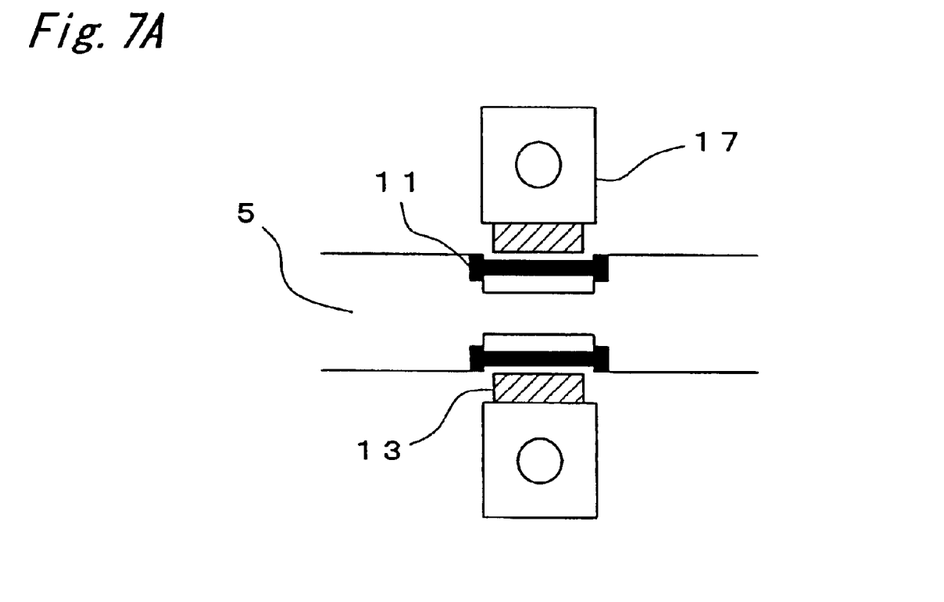
FIG. 7A is a pattern diagram of a switching element employed in a semiconductor device according to a fifth embodiment of the present invention (the switching element is provided with a plurality of anode electrodes)
Figure 7B:
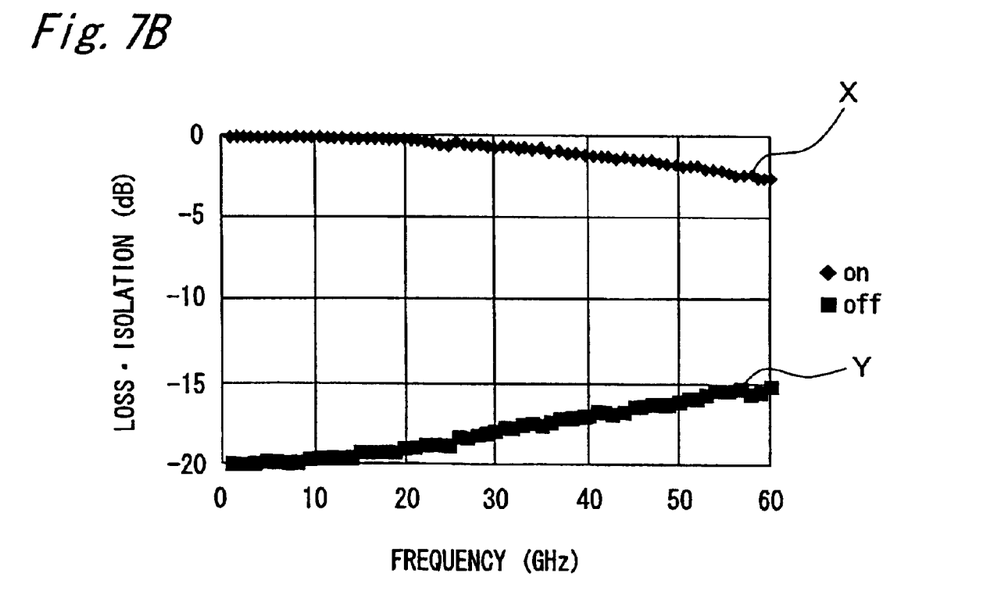
FIG. 7B shows characteristics of an insertion loss in an on-state and an isolation in an off-state for the switching element of the fifth embodiment.

FIG. 7A shows still another electrode arrangement in a switching element according to the present invention. In the illustrated embodiment, a pair of concavities are provided partially in both widthwise side surfaces of a transmission line 5, respectively. A pair of anode electrodes 11 are disposed in the concavities in the longitudinal direction of the transmission line 5, respectively (that is, each anode electrodes 11 connects the two portions of the line 5 each other). Each of the anode electrodes 11 is connected with a cathode electrode 13 and a via hole. An on-resistance Ron during the switching off operation is reduced by increasing the number of the anode electrodes 11, and therefore an isolation characteristic may be further enhanced as compared to that from the first embodiment. FIG. 7B shows characteristics of an insertion loss (X) in the on-state and an isolation (Y) in the off-state for the switching element arranged as above.

Sixth Embodiment.

Figure 8:
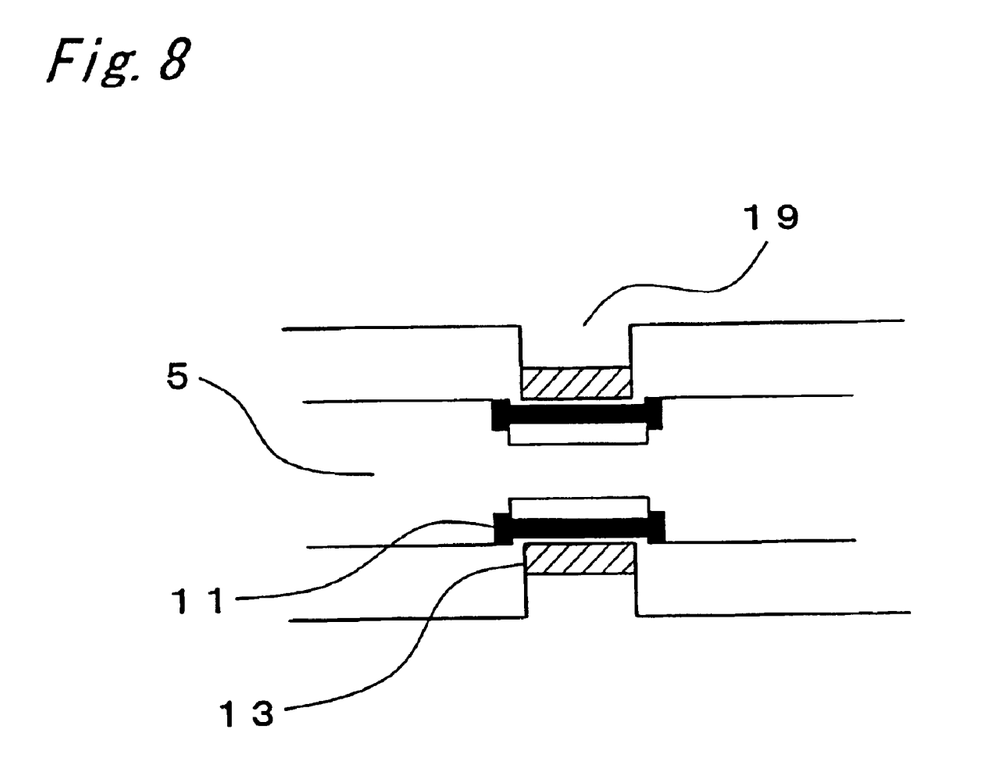
FIG. 8 is a pattern diagram of a switching element employed in a semiconductor device according to a sixth embodiment of the present invention, wherein the electrode arrangement in the switching element according to the fifth embodiment is applied to a coplanar line.

FIG. 8 shows a pattern in which the electrode arrangement in the switching element according to the fifth embodiment is applied to a coplanar line. A pair of grooves are provided partially in both widthwise side surfaces of a transmission line 5 for transmitting signals, respectively. A pair of anode electrodes 11 are disposed in the grooves in the longitudinal direction of the transmission line 5, respectively. A pair of cathode electrodes 13 are connected, respectively, to a pair of grooves formed in a grounding line 19. This embodiment can achieve, without the via hole, simplified process and reduced cost in manufacturing, as with the third and fourth embodiments.

Seventh Embodiment.

Figure 9:
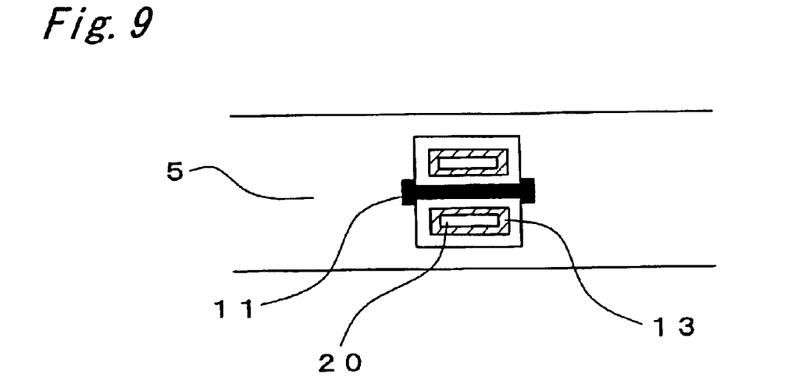
FIG. 9 a pattern diagram of a switching element employed in a semiconductor device according to a seventh embodiment of the present invention, wherein a via hole is provided in a cathode electrode.

FIG. 9 shows yet another electrode arrangement in a switching element according to the present invention. A region having no pattern is formed in a transmission line 5, and an anode electrode 11 is arranged in the region. A pair of cathode electrodes 13 are arranged on both widthwise sides of the anode electrode 11, and a via hole 20 is formed within each of the cathode electrodes 13. This arrangement allows the distance between the transmission line 5 and the ground to be further reduced as compared to the first embodiment. This allows e parasitic inductance component L in the formula (1) to be reduced and isolation characteristic to be enhanced.

Eighth Embodiment.

Figure 10:
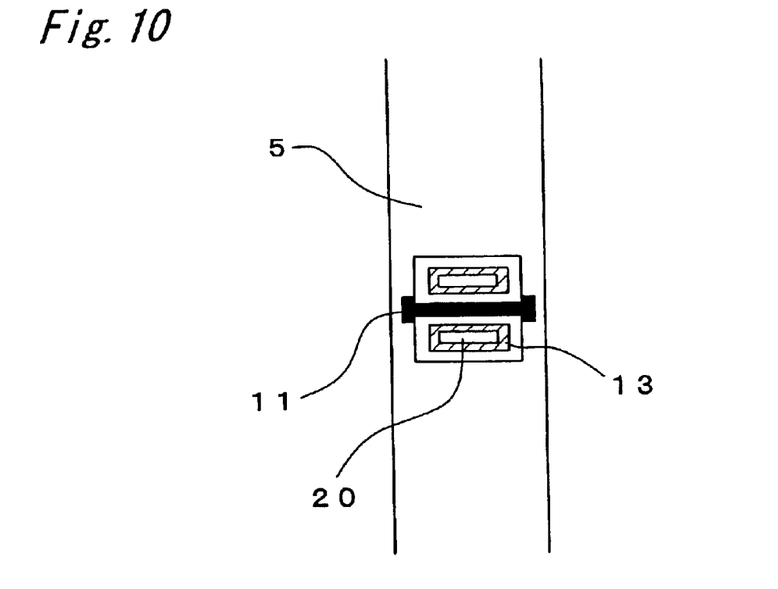
FIG. 10 is a pattern diagram of a switching element employed in a semiconductor device according to an eighth embodiment of the present invention, wherein the electrode arrangement of the seventh embodiment is rotated by 90 degrees with respect to a transmission line.

FIG. 10 shows another embodiment in which the electrode of the switching element according to the seventh embodiment is rotated by 90 degrees with respect to the transmission line 5. By combining the switching elements of the seventh and eighth embodiments, it becomes possible to arrange the transmission lines each extending in two different directions crossing at a right angle on the same substrate.

Ninth Embodiment.

Figure 11:
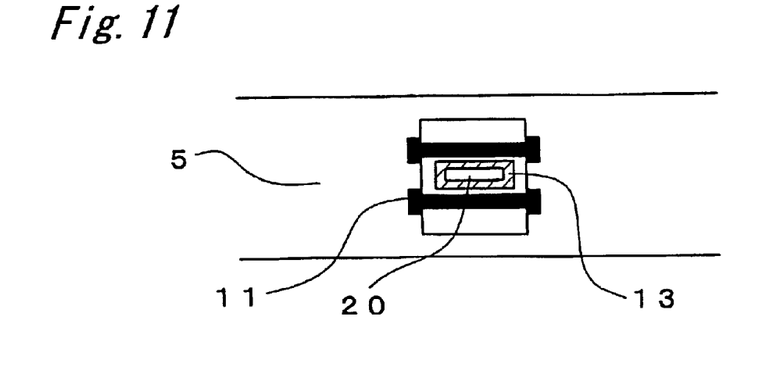
FIG. 11 is a pattern diagram of a switching element employed in a semiconductor device according to a ninth embodiment of the present invention, wherein a via hole is provided in a cathode electrode, and the switching element is provided with a plurality of anode electrodes.

FIG. 11 shows still another example of electrode arrangement of a switching element according to the present invention. As illustrated, two anode electrodes 11 are arranged with respect to the longitudinal direction of a transmission line 5. A cathode electrode 13 is provided between the anode electrodes 11, and a via hole 20 is provided in the cathode electrode 13. Thus, increase of the number of the anode electrodes 11 can reduce an on-resistance Ron to improve an isolation characteristic as compared to the first embodiment.

Tenth Embodiment.

Figure 12:
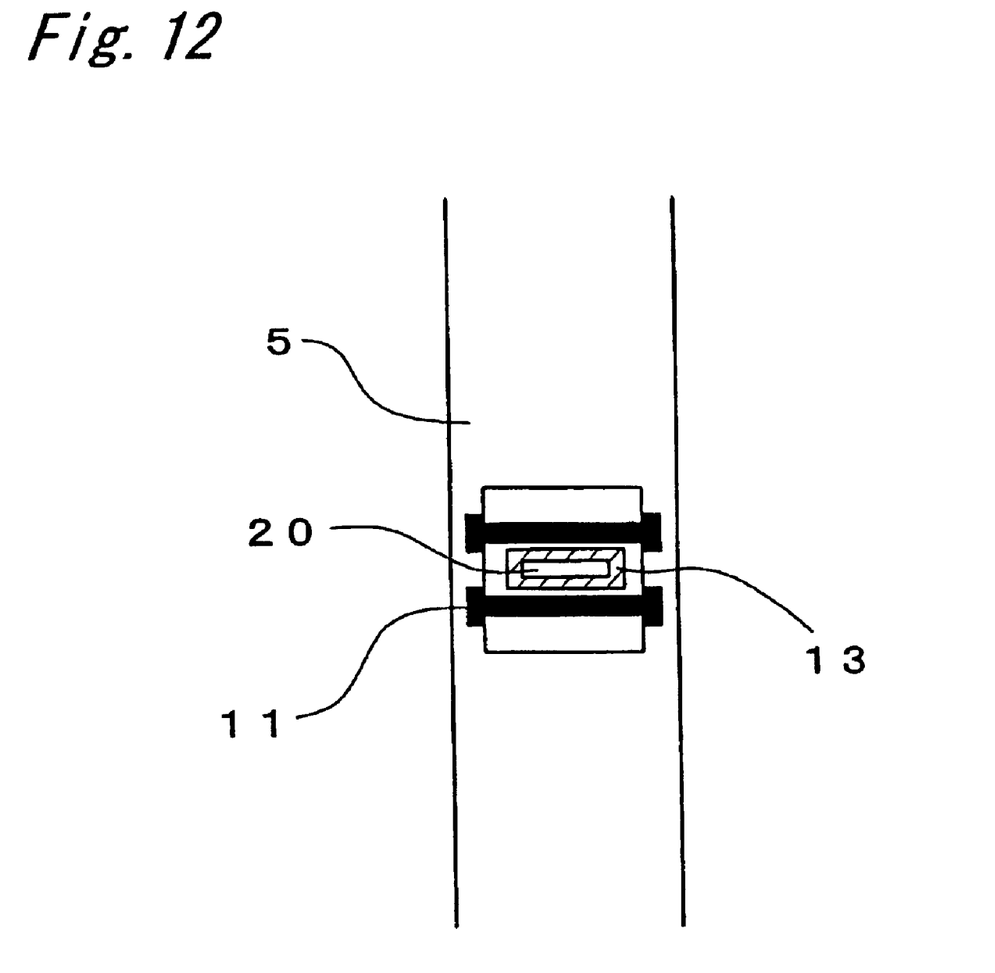
FIG. 12 is a pattern diagram of a switching element employed in a semiconductor device according to a tenth embodiment of the present invention, wherein the electrode arrangement of the ninth embodiment is rotated by 90 degrees with respect to a transmission line.

FIG. 12 shows another example in which the electrode arrangement of the ninth embodiment is rotated by 90 degrees with respect to the transmission line 5. By using the switching elements of the ninth and tenth embodiments in combination with each other, the transmission lines extending in the respective different directions crossing at a right angle can be arranged on the same substrate such that an IC having flexibility in designing directions of input/output terminals can be achieved.

As described above, according to the present invention, the distance between the anode electrode and the via hole can be reduced, thus to eliminate affection of a parasitic inductance and improve an isolation characteristic during an off-state of an switching element.

Although the present invention has been described in connection with specified embodiments thereof, many other modifications, corrections and applications are apparent to those skilled in the art. Therefore, the present invention is not limited by the disclosure provided herein but limited only to the scope of the appended claims.

The present disclosure relates to subject matter contained in Japanese Patent Application No. 2002-121123, filed on Apr. 23, 2002, which is expressly incorporated herein by reference in its entirety.

What is claimed is:

1. A semiconductor device including:
    a transmission line having two portions; and
    a switching element for controlling transmission and cutoff of a signal transmitted between the two portions of the transmission line, the switching element comprising:
        an anode electrode interposed between the two portions of the transmission line, a longitudinal direction of the anode electrode being aligned with a longitudinal direction of the transmission line,
        a cathode electrode disposed on at least one side of the anode electrode, transverse to the longitudinal direction of the anode electrode, and connected to a ground, and
        a via hole connected to the cathode electrode and to the around.

2. The semiconductor device according to claim 1, including an air bridge coupling the two portions of the transmission line to each other and passing over the switching element.

3. The semiconductor device according to claim 1, wherein the transmission line comprises a coplanar line which includes a signal line and a ground line, the anode electrode is connected to the signal line, and the cathode electrode is connected to the ground line.

4. The semiconductor device according to claim 1, wherein the switching element has a plurality of anode electrodes.

5. The semiconductor device according to claim 1, wherein the via hole is located within the cathode electrode.

6. A semiconductor device including:
    a transmission line having two portions; and
    a switching element for controlling transmission and cutoff of a signal transmitted between the two portions of the transmission line, the switching element comprising:
        an anode electrode interposed between the two portions of the transmission line and having a longitudinal direction perpendicular to a longitudinal direction of the transmission line; and
        a cathode electrode disposed on at least one side of the anode electrode, transverse to the longitudinal direction of the anode electrode, and connected to a ground.

7. The semiconductor device according to claim 6, including an air bridge coupling the anode electrode to the transmission line.

8. The semiconductor device according to claim 6, including a via hole connected to the cathode electrode and to the ground.

9. The semiconductor device according to claim 6, wherein the transmission line comprises a coplanar line which includes a signal line and a ground line, the anode electrode is connected to the signal line, and the cathode electrode is connected to the ground line.

10. The semiconductor device according to claim 6, wherein the switching element has a plurality of anode electrodes.

11. The semiconductor device according to claim 6, including a via hole within the cathode electrode.

12. A semiconductor device including:
    a substrate,
    a transmission line having two portions supported by the substrate; and
    a switching element for controlling transmission and cutoff of a signal transmitted between the two portions of the transmission line, the switching element comprising:
        an anode electrode interposed between the two portions of the transmission line, a longitudinal direction of the anode electrode being aligned with a longitudinal direction of the transmission line;
        a cathode electrode disposed on at least one side of the anode electrode, transverse to the longitudinal direction of the anode electrode, and connected to a ground; and
        an air bridge coupling the two portions of the transmission line to each other, the cathode electrode being disposed between the substrate and the air bridge.

13. The semiconductor device according to claim 12, wherein the via hole is located within the cathode electrode.

14. The semiconductor device according to claim 12, including a via hole connected to the cathode electrode and to the ground.

15. The semiconductor device according to claim 12, wherein the transmission line comprises a coplanar line which includes a signal line and a ground line, the anode electrode is connected to the signal line, and the cathode electrode is connected to the ground line.

16. The semiconductor device according to claim 12, wherein the switching element has a plurality of anode electrodes.

* * * * *